(12) United States Patent
Schiffmann et al.

(10) Patent No.: US 11,511,753 B2
(45) Date of Patent: Nov. 29, 2022

(54) DRIVING SURFACE FRICTION CHARACTERISTIC DETERMINATION

(71) Applicant: APTIV TECHNOLOGIES LIMITED, St. Michael (BB)

(72) Inventors: Jan Schiffmann, Newbury Park, CA (US); Henrik Clasen, Torslanda (SE); David Aaron Schwartz, Moorpark, CA (US); Amith Somanath, Woodland Hills, CA (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 30 days.

(21) Appl. No.: 17/080,016

(22) Filed: Oct. 26, 2020

(65) Prior Publication Data
US 2022/0126834 A1    Apr. 28, 2022

(51) Int. Cl.
*B60W 40/068* (2012.01)
*B60W 30/02* (2012.01)

(52) U.S. Cl.
CPC .......... *B60W 40/068* (2013.01); *B60W 30/02* (2013.01); *B60W 2420/52* (2013.01);
(Continued)

(58) Field of Classification Search
CPC .......... B60W 40/068; B60W 2520/26; B60W 2520/28; B60W 2520/06; B60W 30/02;
(Continued)

(56) References Cited

U.S. PATENT DOCUMENTS

2002/0183913 A1* 12/2002 Ehret ................. B60W 30/02
                                                              701/72
2005/0038589 A1*  2/2005 Shukla ................ B60T 8/172
                                                              701/80
(Continued)

FOREIGN PATENT DOCUMENTS

DE    102011118249 A1    5/2013
DE    102017214022 A1    2/2019
DE    102019202178 A1    6/2020

OTHER PUBLICATIONS

Kellner, et al., Instantaneous Ego-Motion Estimation using Multiple Doppler Radars, 2014 IEEE International Conference on Robotics & Automation (ICRA), Hong Kong Convention and Exhibition Center, May 31-Jun. 7, 2014. Hong Kong, China, pp. 1592-1597.
(Continued)

*Primary Examiner* — Christian Chace
*Assistant Examiner* — Shayne M. Gilbertson
(74) *Attorney, Agent, or Firm* — Carlson, Gaskey & Olds, P.C.

(57) ABSTRACT

An illustrative example method is for estimating a friction characteristic of a surface beneath a vehicle that has a plurality of wheels contacting the surface. The method includes determining a wheel speed of at least one of the wheels, determining a velocity of the at least one of the wheels separately from determining the wheel speed, determining a wheel slip of the at least one of the wheels based on the determined wheel speed and the determined velocity, and determining the friction characteristic based on the determined wheel slip. Determining the velocity separately from the wheel speed is accomplished using at least one detector that provides an output corresponding to a range rate, such as a RADAR or LIDAR detector.

14 Claims, 3 Drawing Sheets

(52) U.S. Cl.
CPC ... *B60W 2520/06* (2013.01); *B60W 2520/105* (2013.01); *B60W 2520/26* (2013.01); *B60W 2520/28* (2013.01); *B60W 2530/20* (2013.01)

(58) Field of Classification Search
CPC ......... B60W 2420/52; B60G 2400/822; B60T 8/172
See application file for complete search history.

(56) References Cited

U.S. PATENT DOCUMENTS

| | | | |
|---|---|---|---|
| 2016/0082972 A1 | 3/2016 | Fairgrieve et al. | |
| 2016/0214645 A1* | 7/2016 | Owen | B60T 8/17552 |
| 2016/0223661 A1* | 8/2016 | Song | G01S 13/86 |
| 2017/0066448 A1* | 3/2017 | Hertel | B60L 3/10 |
| 2019/0308611 A1 | 10/2019 | Lee et al. | |
| 2020/0079381 A1* | 3/2020 | Lombrozo | B62D 6/003 |
| 2020/0290625 A1* | 9/2020 | Berntorp | B60W 40/068 |
| 2021/0197815 A1* | 7/2021 | Pitzer | B60W 40/10 |

OTHER PUBLICATIONS

Extended European Search Report for Application No. EP 21 20 0560 dated Mar. 29, 2022.

\* cited by examiner

DRIVING SURFACE FRICTION CHARACTERISTIC DETERMINATION

BACKGROUND

Modern automotive vehicles include an increasing amount of electronic technology, such as sensors or detectors that provide driver assistance or autonomous vehicle control. Information regarding the movement or heading direction of the vehicle and the environment around the vehicle is useful or necessary for such assistance or control. There are various ways to obtain such information. For example GNSS satellite technology allows for determining and tracking vehicle location, movement or direction information based on detecting multiple satellites and using known algorithms Inertial measurement units (IMUs) are useful for tracking vehicle movement in certain circumstances. Various sensors are useful to detect objects or lane markings near the vehicle.

While such sensors and the information they provide have proven useful, there are other types of information that would be useful for better driver assistance or enhanced autonomous vehicle control.

SUMMARY

An illustrative example method is for estimating a friction characteristic of a surface beneath a vehicle that has a plurality of wheels contacting the surface. The method includes determining a wheel speed of at least one of the wheels, determining a velocity of the at least one of the wheels separately from determining the wheel speed, determining a wheel slip of the at least one of the wheels based on the determined wheel speed and the determined velocity, and determining the friction characteristic based on the determined wheel slip.

In an example embodiment having at least one feature of the method of the previous paragraph, determining the velocity is based on an indication of a range rate from a detector associated with a portion of the vehicle near the at least one of the wheels.

An example embodiment having at least one feature of the method of any of the previous paragraphs includes determining the velocity of each of the plurality of wheels based on an indication of a range rate from a respective detector associated with a respective portion of the vehicle near each of the wheels.

In an example embodiment having at least one feature of the method of any of the previous paragraphs, determining the friction characteristic comprises determining a vehicle acceleration of the vehicle and determining the friction characteristic from a relationship between the friction characteristic, the determined wheel slip, and the vehicle acceleration.

In an example embodiment having at least one feature of the method of any of the previous paragraphs, determining the vehicle acceleration comprises determining a net force on the vehicle in a direction of movement of the vehicle.

In an example embodiment having at least one feature of the method of any of the previous paragraphs, determining the net force comprises using at least one sensor to provide an output indicating an acceleration of at least a portion of the vehicle.

In an example embodiment having at least one feature of the method of any of the previous paragraphs, the relationship defines the friction characteristic as the vehicle acceleration divided by a product of the determined wheel slip and acceleration due to gravity.

An example embodiment having at least one feature of the method of any of the previous paragraphs includes determining the wheel speed and the velocity of all of the plurality of the wheels and the relationship defines the friction characteristic by a product of the vehicle acceleration and a number of wheels in the plurality of wheels divided by a product of a sum of the determined wheel slip at each of the wheels and acceleration due to gravity.

In an example embodiment having at least one feature of the method of any of the previous paragraphs, determining the wheel speed comprises determining a rotational speed of the at least one of the wheels and determining a radius of each vehicle wheel.

An example embodiment having at least one feature of the method of any of the previous paragraphs includes controlling at least one aspect of movement of the vehicle based on the determined friction characteristic.

An illustrative example embodiment of a system for estimating a friction characteristic of a surface beneath a vehicle that has a plurality of wheels engaging the surface includes a plurality of wheel speed sensors, each associated with a respective one of the wheels. At least one detector provides an output corresponding to a velocity of at least a portion of the vehicle near at least one of the wheels. A processor is configured to determine a wheel speed of at least one of the wheels based on an indication from a corresponding one of the wheel speed sensors, determine a velocity of the at least one of the wheels based on the output of the at least one detector, determine a wheel slip of the at least one of the wheels based on the determined wheel speed and the determined velocity, and determine the friction characteristic based on the determined wheel slip.

In an example embodiment having at least one feature of the system of the previous paragraph, the at least one detector is associated with a portion of the vehicle near the at least one of the wheels, the at least one detector output corresponds to a range rate, and the processor is configured to determine the velocity based on the range rate.

In an example embodiment having at least one feature of the system of any of the previous paragraphs, the at least one detector comprises a plurality of detectors, each of the detectors is associated with a portion of the vehicle near a corresponding one of the plurality of wheels, and the processor is configured to determine the velocity of each of the wheels based on an indication of a range rate from a respective one of the plurality of detectors.

In an example embodiment having at least one feature of the system of any of the previous paragraphs, the processor is configured to determine the friction characteristic by determining a vehicle acceleration of the vehicle and determining the friction characteristic from a relationship between the friction characteristic, the determined wheel slip, and the vehicle acceleration.

In an example embodiment having at least one feature of the system of any of the previous paragraphs, the processor is configured to determine the vehicle acceleration by determining a net force on the vehicle in a direction of movement of the vehicle.

An example embodiment having at least one feature of the system of any of the previous paragraphs includes at least one acceleration sensor that provides an output indicating an acceleration of at least a portion of the vehicle and wherein the processor is configured to determine the vehicle acceleration based on the output of the at least one acceleration sensor.

In an example embodiment having at least one feature of the system of any of the previous paragraphs, the relationship defines the friction characteristic as the vehicle acceleration divided by a product of the determined wheel slip and acceleration due to gravity.

In an example embodiment having at least one feature of the system of any of the previous paragraphs, the processor is configured to determine the wheel speed, the velocity, and the wheel slip of all of the plurality of the wheels; and the relationship defines the friction characteristic by a product of the vehicle acceleration and a number of wheels in the plurality of wheels divided by a product of a sum of the determined wheel slip at each of the wheels and acceleration due to gravity.

In an example embodiment having at least one feature of the system of any of the previous paragraphs, the processor is configured to determine the wheel speed by determining a rotational speed of the at least one of the wheels and determining a radius of each vehicle wheel.

In an example embodiment having at least one feature of the system of any of the previous paragraphs, the processor is configured to control at least one aspect of movement of the vehicle based on the determined friction characteristic.

The various features and advantages of at least one disclosed example embodiment will become apparent to those skilled in the art from the following detailed description. The drawings that accompany the detailed description can be briefly described as follows.

DETAILED DESCRIPTION

Embodiments of this invention, such as that described below, include using information from at least one detector that provides an indication of vehicle motion in a process of estimating a friction characteristic of a driving surface. For example, RADAR or LIDAR detectors provide range rate information indicating movement of a vehicle. Such information can be used with wheel speed information from a wheel speed sensor to estimate the friction characteristic.

Figure 1:
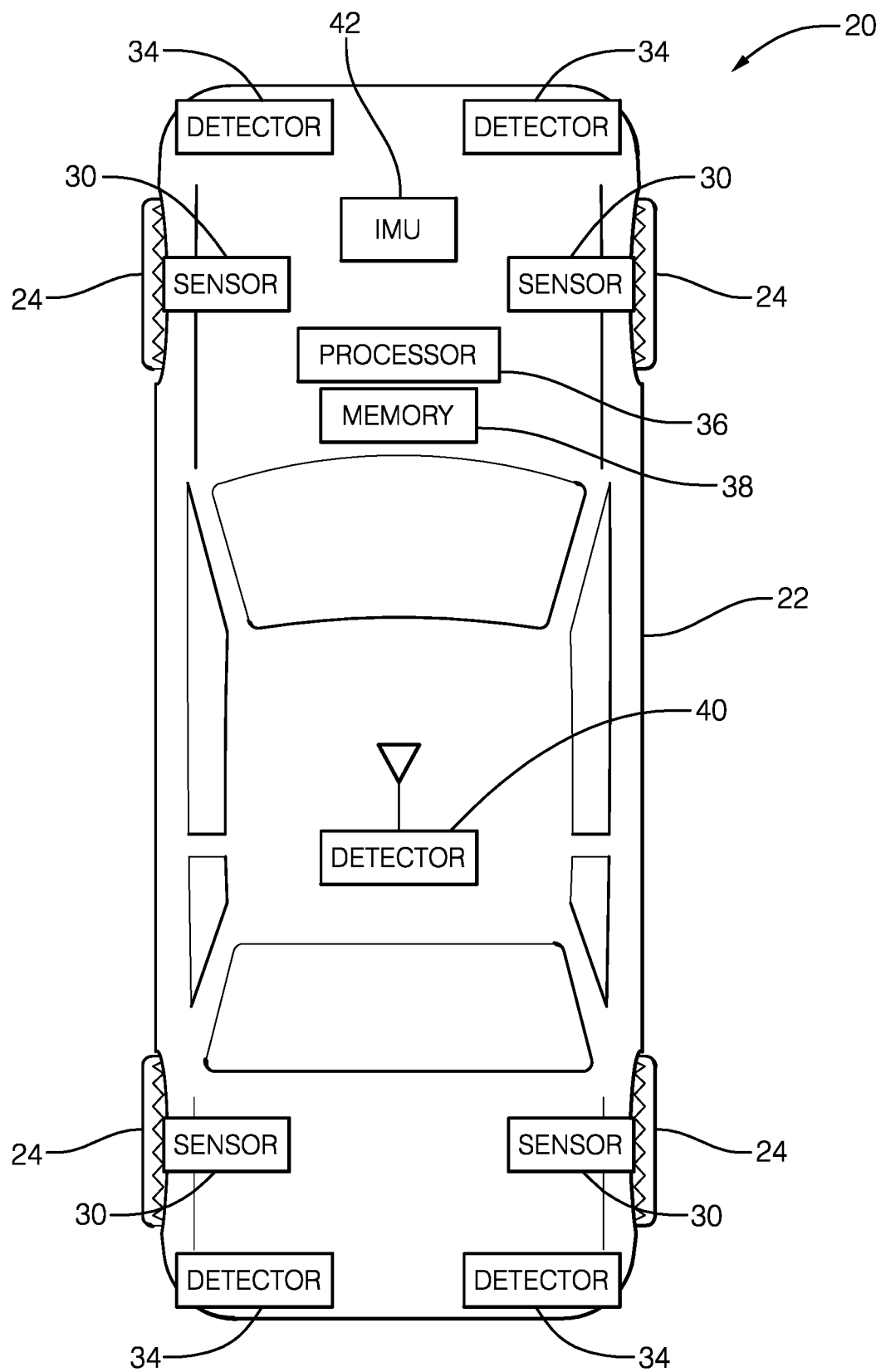
FIG. 1 schematically illustrates an example system for estimating a friction characteristic of a driving surface.

FIG. 1 schematically illustrates a system 20 for estimating a friction characteristic, such as a coefficient of friction, of a driving surface, such as a road or pathway. The example system 20 is shown on a vehicle 22 that includes a plurality of wheels 24 that contact the driving surface.

A plurality of wheel speed sensors 30 are respectively associated with the wheels 24. Each wheel speed sensor 30 provides an indication of a rotational speed of the associated wheel 24. In the illustrated example embodiment, a wheel speed sensor 30 is associated with each wheel 24 and the wheel speed information for any of the wheels 24 may be utilized. In an example embodiment described below, wheel speed information regarding all of the wheels 24 is utilized. In some embodiments only one or another number of the wheels 24 that is less than all of the wheels may be included in a determination of a friction characteristic of the driving surface.

A plurality of detectors 32 are associated with the vehicle 22 and, in the illustrated example embodiment, are situated near the four outer corners of the vehicle 22. Each of the detectors 32 in this example is associated with a portion of the vehicle 22 that is near one of the wheels 24. The detectors 32 provide an output that corresponds to a velocity of the corresponding portion of the vehicle 22.

In some embodiments, the detectors 32 are RADAR detectors. In other embodiments, the detectors 32 are LIDAR detectors. The detectors 32 in such embodiments provide range rate information regarding relative movement between the vehicle 22 and one or more objects in a vicinity of the vehicle 22. The range rate information provides information regarding the velocity of the portion of the vehicle 22 associated with each detector 32.

A processor 36 includes at least one computing device, such as a microprocessor, and has associated memory 38. In some embodiments, the processor 36 is realized through a portion or a functionality of a vehicle controller, such as an engine control unit. In other embodiments, the processor 36 is a device that is separate from other controllers or processors on the vehicle 22.

The system 20 includes at last one acceleration sensor that provides an output indicating an acceleration of at least a portion of the vehicle 22. In the illustrated example embodiment, one acceleration sensor is a detector 40 that is configured to detect GNSS satellite signals. The processor 36 is configured to use information from the detector 40 regarding movement of the vehicle 22 to determine an acceleration of the vehicle 22. Another acceleration sensor 42 is included in this embodiment. The acceleration sensor 42 is an inertial measurement unit (IMU) that senses acceleration of the vehicle 22 and provides an output indicating the acceleration to the processor 36.

The processor 36 uses information from at least selected ones of the sensors and detectors of the system 20 for estimating a friction characteristic, such as the coefficient of friction, of the driving surface. For example, the processor 36 determines a wheel speed of a selected number of the wheels 24 based on an indication from the corresponding wheel speed sensors 30. The processor 32 determines a velocity of the selected wheels 24 based on the output from corresponding detectors 32. The processor 36 determines a wheel slip of the selected wheels 24 based on the determined wheel speed and the determined velocity. The processor 36 determines the friction characteristic based on the determined wheel slip.

Figure 2:
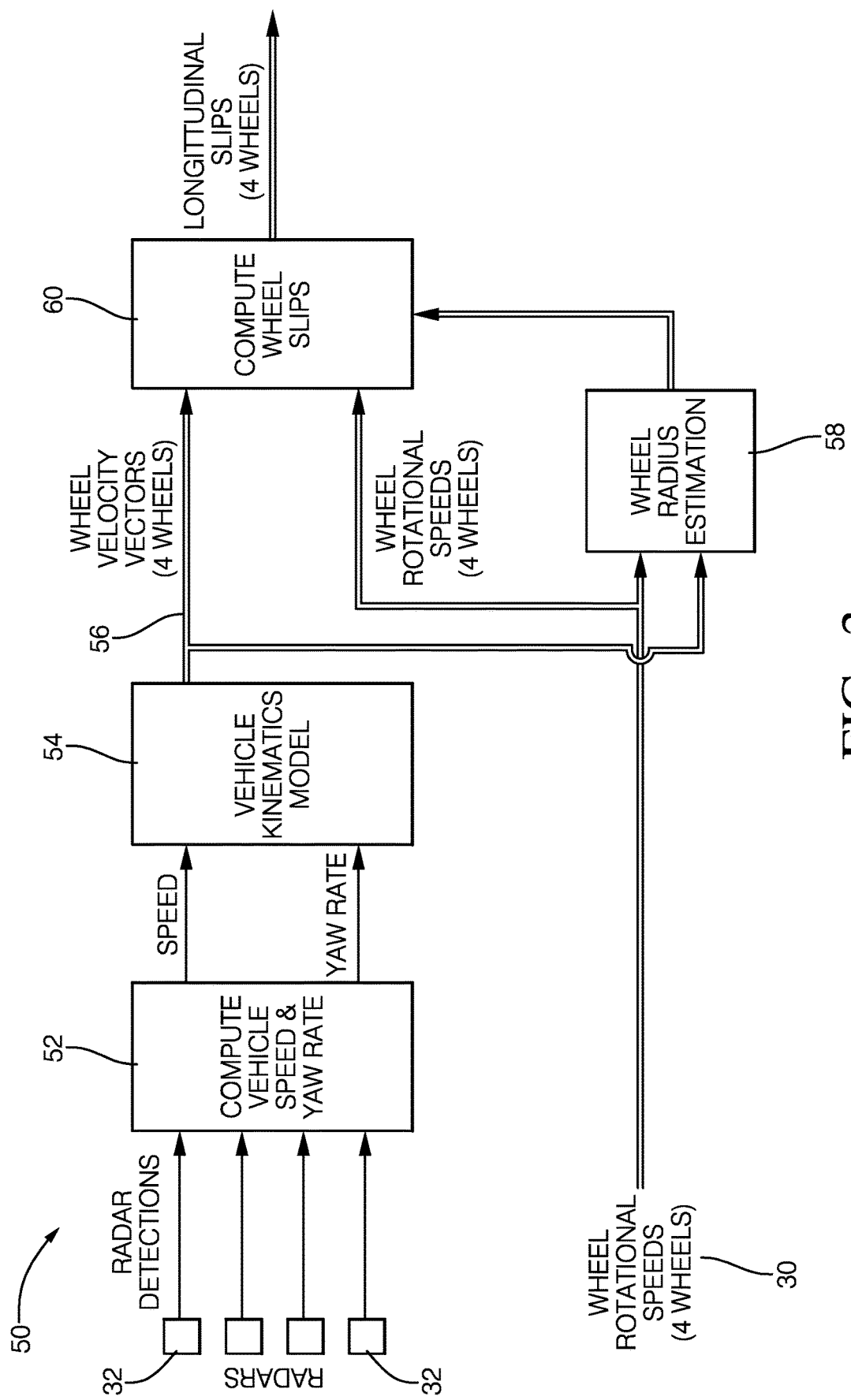
FIG. 2 schematically illustrates an example technique of determining wheel slip information, which is useful for determining a driving surface friction characteristic.
Figure 3:
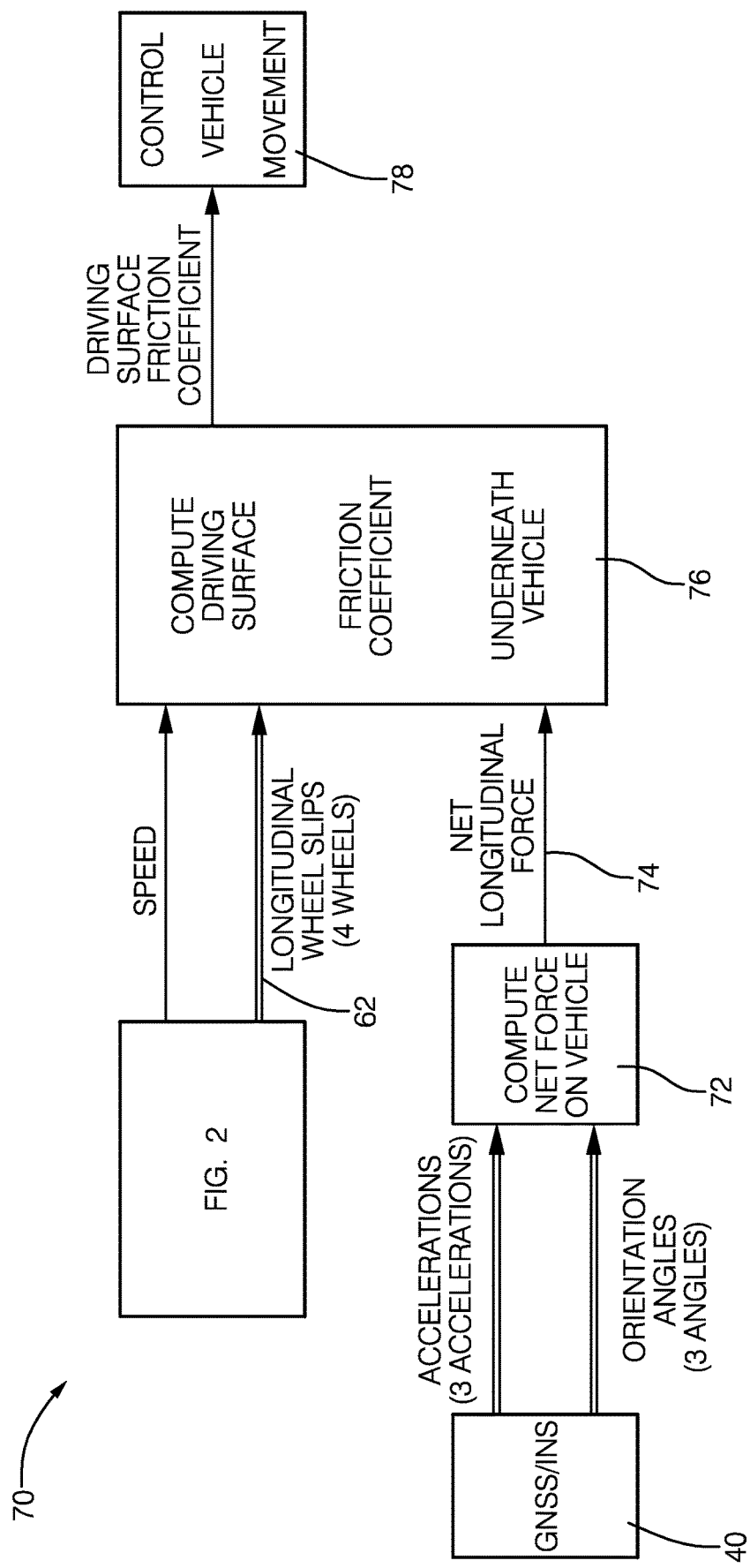
FIG. 3 schematically illustrates an example technique of determining a friction characteristic using the wheel slip information from FIG. 2.

FIGS. 2 and 3 are a flowchart style diagrams that illustrate an example approach. For discussion purposes, all four wheels 24 are included in the example method described below. It is possible to use fewer than all of the wheels on a vehicle to determine a friction characteristic in a manner that is consistent with this description.

In the flow chart diagram 50 of FIG. 2, the processor 36 receives information from the detectors 32 and determines a vehicle speed and yaw rate at 52. Techniques for using multiple sensor detections to determine vehicle speed and yaw rate are known.

For example, when the detectors 32 are RADAR detectors, the processor 36 receives indications from the detectors 32 regarding relative movement between corresponding portions of the vehicle 22 and nearby objects. When those objects are stationary, the relative movement indication corresponds to movement of the associated portion of the vehicle 22. The processor 36 is configured, or programmed, to utilize such information to determine a velocity vector for the associated portion of the vehicle 22 and to use that information to determine the vehicle speed and yaw rate at 52.

At 54, the processor 36 uses a vehicle dynamics model and determines an individual wheel velocity vector for each of the wheels 24. One example embodiment includes using a technique consistent with the description in the publication, Instantaneous Ego-Motion Estimation Using Multiple Doppler Radars, Kellner et al., IEEE International Conference on Robotics and Automation, 2014. The teachings of that document are incorporated into this description by reference in their entirety.

As shown in FIG. 2, the wheel speed sensors 30 provide wheel rotational speed information to the processor 36. At 58, the processor 36 estimates a radius of each wheel 24. The processor 36 has information, such as data stored in the memory 38, regarding the size of the wheels 24 of the vehicle 22. In some embodiments, the processor 36 utilizes information regarding a current air pressure of each tire as part of the wheel radius estimation at 58.

The processor uses the wheel radius information and the rotational speed information from the wheel speed sensors 30 to determine a longitudinal wheel speed of each wheel. The longitudinal speed of each wheel is equal to the rotational speed times the radius, v=Rω, where v is the longitudinal velocity, R is the radius, and ω is the rotational speed.

The wheel speed sensors 30 provide one indication of wheel speed and the detectors 32 provide another indication of wheel speed separately from the wheel speed sensors 30. The wheel speed information from the wheel speed sensors 30 is based on the rotational speed of each wheel but does not provide wheel slip information. The velocity vectors at 56 provide longitudinal speed information for each wheel.

At 60, the processor 36 determines wheel slip information for each wheel 24. In the illustrated example embodiment, the processor 36 determines a difference between the longitudinal wheel speeds indicated by the velocity vectors determined at 56 and the wheel speeds based on the rotational speed and corresponding radius of each wheel. The difference between those speeds corresponds to an amount of wheel slip at each wheel 24.

A braking slip ratio λ is described by the following equation:

$$\lambda = 1 - \frac{R\omega}{v}$$

The processor 36 uses this relationship at 60 to generate the wheel slips provided at 62.

FIG. 3 is a flowchart style diagram 70 summarizing how the processor 36 determines a friction characteristic of the driving surface based upon the wheel slip information determined in FIG. 2. Acceleration information is provided by at least one of the acceleration sensors 40, 42 to the processor 36. At 72, the processor 36 determines a net force on the vehicle 22. The processor 36 utilizes that determined force, the vehicle speed and the determined wheel slip information at 76 to determine the driving surface friction characteristic. Since the wheels 24 generate a force with some slip, which depends at least in part on the friction characteristic of the driving surface, a relationship between the determined net force and the wheel slip information provides an indication of the friction characteristic.

The longitudinal force of each wheel 24 can be described by the following equation:
where F is the longitudinal force, N is the normal force at the wheel 24, μ is the co-efficient of friction between the wheel and the driving surface, and f(λ) represents a μ-slip curve. In some embodiments, f(λ) is a function of the μ of the driving surface.

Considering all of the wheels 24, the net force on the vehicle 22 is represented by a sum of the force imposed by each wheel 24, which can be represented using the following equation:

$$F = \sum_i F_i = -\sum_i N_i \mu_i f(\lambda_i)$$

This example embodiment includes assuming that μ has the same value for each wheel 24 and that the normal load N on each wheel 24 is the same. Other embodiments do not necessarily include one or both of those assumptions. The total normal force can be represented by the following equation:

$$N_i = Mg/4$$

This example embodiment includes assuming that μ is the same for each wheel under consideration and ignoring the effects of aerodynamic drag. Other embodiments do not necessarily include that assumption. The net longitudinal force F on the vehicle having an acceleration a and a total mass M can be represented by the following equation:

$$F = Ma = -\sum_i \frac{Mg}{4} \mu f(\lambda_i)$$

Solving for μ yields $$\mu = \frac{-4a}{g \sum_i f(\lambda_i)}$$

In FIG. 3, at 76, the processor 36 uses the relationship between the friction characteristic μ, the determined wheel slip λ and the vehicle acceleration a as represented by the preceding equation to determine the friction characteristic of the driving surface. In this example embodiment, the determined friction characteristic corresponds to the coefficient of friction between the wheels 24 and the driving surface.

At 78, the processor 36, or another vehicle control unit in communication with the processor 36, controls at least one aspect of vehicle movement at 78. For example, a control parameter used for applying vehicle brakes may be adjusted depending on the friction characteristic of the road surface to maintain adequate braking distance for bringing the vehicle 22 to a stop when necessary or desired. Other aspects of vehicle movement control that may be adjusted include, among others, steering angle, acceleration rate and route selection.

The disclosed example embodiment, and others consistent with this description, estimates a friction characteristic of a driving surface utilizing information available from sensors and detectors that may already be present on a vehicle. No additional sensors are needed to acquire additional information that is useful for vehicle control. The determined friction characteristic information facilitates improved vehicle control through enhanced driver assistance or autonomous driving.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of estimating a friction characteristic of a surface beneath a vehicle that has a plurality of wheels contacting the surface, the method comprising:
   determining a wheel speed of at least one of the wheels;
   determining a velocity of the at least one of the wheels separately from determining the wheel speed;
   determining a wheel slip of the at least one of the wheels based on the determined wheel speed and the determined velocity;
   determining the friction characteristic based on the determined wheel slip by determining a vehicle acceleration of the vehicle and determining the friction characteristic from a relationship between the friction characteristic, the determined wheel slip, and the vehicle acceleration, wherein the relationship defines the friction characteristic as the vehicle acceleration divided by a product of the determined wheel slip and acceleration due to gravity; and
   controlling at least one aspect of movement of the vehicle based on the determined friction characteristic.

2. The method of claim 1, wherein determining the velocity is based on an indication of a range rate from a detector associated with a portion of the vehicle near the at least one of the wheels.

3. The method of claim 2, comprising determining the velocity of each of the plurality of wheels based on an indication of a range rate from a respective detector associated with a respective portion of the vehicle near each of the wheels.

4. The method of claim 1, wherein determining the vehicle acceleration comprises determining a net force on the vehicle in a direction of movement of the vehicle.

5. The method of claim 4, wherein determining the net force comprises using at least one sensor to provide an output indicating an acceleration of at least a portion of the vehicle.

6. The method of claim 1, comprising determining the wheel speed and the velocity of all of the plurality of the wheels and the relationship defines the friction characteristic by a product of the vehicle acceleration and a number of wheels in the plurality of wheels divided by a product of a sum of the determined wheel slip at each of the wheels and acceleration due to gravity.

7. The method of claim 1, wherein determining the wheel speed comprises determining a rotational speed of the at least one of the wheels and determining a radius of each vehicle wheel.

8. A system for estimating a friction characteristic of a surface beneath a vehicle that has a plurality of wheels engaging the surface, the system comprising:
   a plurality of wheel speed sensors, each associated with a respective one of the wheels;
   at least one detector that provides an output corresponding to a velocity of at least a portion of the vehicle near at least one of the wheels; and
   a processor that is configured to
      determine a wheel speed of at least one of the wheels based on an indication from a corresponding one of the wheel speed sensors;
      determine a velocity of the at least one of the wheels based on the output of the at least one detector;
      determine a wheel slip of the at least one of the wheels based on the determined wheel speed and the determined velocity;
      determine the friction characteristic based on the determined wheel slip;
      determine the friction characteristic by determining a vehicle acceleration of the vehicle and determining the friction characteristic from a relationship between the friction characteristic, the determined wheel slip, and the vehicle acceleration, wherein the relationship defines the friction characteristic as the vehicle acceleration divided by a product of the determined wheel slip and acceleration due to gravity; and
      control at least one aspect of movement of the vehicle based on the determined friction characteristic.

9. The system of claim 8, wherein
   the at least one detector is associated with a portion of the vehicle near the at least one of the wheels,
   the at least one detector output corresponds to a range rate, and
   the processor is configured to determine the velocity based on the range rate.

10. The system of claim 9, wherein
    the at least one detector comprises a plurality of detectors,
    each of the detectors is associated with a portion of the vehicle near a corresponding one of the plurality of wheels, and
    the processor is configured to determine the velocity of each of the wheels based on an indication of a range rate from a respective one of the plurality of detectors.

11. The system of claim 8, wherein the processor is configured to determine the vehicle acceleration by determining a net force on the vehicle in a direction of movement of the vehicle.

12. The system of claim 11, comprising at least one acceleration sensor that provides an output indicating an acceleration of at least a portion of the vehicle and wherein the processor is configured to determine the vehicle acceleration based on the output of the at least one acceleration sensor.

13. The system of claim 8, wherein
    the processor is configured to determine the wheel speed, the velocity, and the wheel slip of all of the plurality of the wheels; and
    the relationship defines the friction characteristic by a product of the vehicle acceleration and a number of wheels in the plurality of wheels divided by a product of a sum of the determined wheel slip at each of the wheels and acceleration due to gravity.

14. The system of claim 8, wherein the processor is configured to determine the wheel speed by determining a rotational speed of the at least one of the wheels and determining a radius of each vehicle wheel.

* * * * *